United States Patent
Wintrich et al.

(10) Patent No.: US 7,035,717 B2
(45) Date of Patent: Apr. 25, 2006

(54) METHOD FOR CONTROLLING A THERMODYNAMIC PROCESS, IN PARTICULAR A COMBUSTION PROCESS

(75) Inventors: Franz Wintrich, Essen (DE); Volker Stephan, Hüpstedt (DE)

(73) Assignee: Powitec Intelligent Technologies GmbH, Essen (DE)

( * ) Notice: Subject to any disclaimer, the term of this patent is extended or adjusted under 35 U.S.C. 154(b) by 256 days.

(21) Appl. No.: 10/653,475

(22) Filed: Sep. 2, 2003

(65) Prior Publication Data

US 2004/0044423 A1 Mar. 4, 2004

Related U.S. Application Data

(63) Continuation of application No. PCT/EP02/02136, filed on Feb. 28, 2002.

(30) Foreign Application Priority Data

| Mar. 2, 2001 | (DE) | 101 10 184 |
| Mar. 14, 2001 | (DE) | 101 12 160 |
| Dec. 10, 2001 | (DE) | 101 60 412 |

(51) Int. Cl.
*G05B 21/00* (2006.01)

(52) U.S. Cl. .......................... 700/274; 700/28; 700/29; 700/30; 700/31; 700/47; 700/48

(58) Field of Classification Search .............. 700/28–31, 700/47–48, 274

See application file for complete search history.

(56) References Cited

U.S. PATENT DOCUMENTS

| 5,517,424 A | * | 5/1996 | Marcelle et al. ............ 700/287 |
| 5,559,690 A |   | 9/1996 | Keeler et al. |
| 5,933,345 A |   | 8/1999 | Martin et al. |
| 6,122,557 A | * | 9/2000 | Harrell et al. ............... 700/45 |
| 6,505,475 B1 | * | 1/2003 | Zugibe et al. ............... 62/192 |

OTHER PUBLICATIONS

*Feuerungsoptimierung mit neuronalen Netzen und Fuzzy-Logic an einem Braunkohlekessel;* K. Pflipsen et al.; VGB Kraftwerkstechnik GmbH, Essen, DE; vol. 80, No. 11, 2000; pp. 47-50.

*Fuzzy Control in Kraftwerken*: C. Gierend; VGB Kraftwerkstechnik GmbH, Essen, DE; vol. 78, No. 5, 1998; pp. 118-125.

*Closed-Loop System for Control of Combustor Pattern Factor*; K. McManus et al.; Control Applications, 1995; IEEE; pp. 699-704.

* cited by examiner

*Primary Examiner*—Anthony Knight
*Assistant Examiner*—Ronald D. Hartman, Jr.
(74) *Attorney, Agent, or Firm*—Womble Carlyle Sandridge & Rice, PLLC

(57) ABSTRACT

In a method for controlling a thermodynamic process, in particular a combustion process, in which the system status ($s_t$) is measured, compared with optimization targets ($r^j$), and in which suitable setting actions ($a^i$) are performed in the system for controlling it, a process model (PM) is determined that is independent of the optimization targets ($r^j$) and which describes the effects of actions ($a_t$) on the system status ($s_t$), and in which a situational evaluation (SB) that is independent of the process model (PM) evaluates the system status ($s_t$) by means of quality functions ($u_t$) with regard to the optimization targets ($r^j$).

28 Claims, 2 Drawing Sheets

METHOD FOR CONTROLLING A THERMODYNAMIC PROCESS, IN PARTICULAR A COMBUSTION PROCESS

CROSS-REFERENCE TO RELATED APPLICATION

This application is a continuation of International Application No. PCT/EP02/02136, which was filed Feb. 28, 2002, and is entirely incorporated herein by reference.

BACKGROUND OF THE INVENTION

The present invention relates to a method for controlling a thermodynamic process, in particular a combustion process, in which the system status is measured and then compared with optimization targets, and in which setting actions suitable for controlling are performed in the system.

In a known method of the above-described type, a quality is obtained from status variables and the possible setting actions through computational folding, taking into account the optimization targets. In the context of a Monte Carlo method, a setting action is carried out using the previous status and then determining the new status. The resulting change in quality is a measure for the suitability of the setting action carried out to reach the optimization target. With this method, the system adapts to the next closest extreme, even when there are frequent changes in the optimization targets. However, the method is still open for improvement.

BRIEF SUMMARY OF THE INVENTION

An aspect of the present invention is the provision of improvements to a method of the above-described type. According to one aspect of the present invention, in a method for controlling a thermodynamic process, in particular a combustion process, in which the system status is measured, compared with optimization targets, and in which suitable setting actions are performed in the system for controlling it, a process model is determined that is independent of the optimization targets and which describes the effects of actions on the system status, and a situational evaluation that is independent of the process model evaluates the system status by means of quality functions with regard to the optimization targets.

Because a process model is determined which is independent of the optimization targets and which describes the effects of actions on the system status, and because a situation evaluation by means of quality functions, which is independent of the process model, evaluates the system status with regard to the optimization targets, a model-based control method is available which can continue to use past information both to evaluate the system and also after major changes in the status. In the known method, on the other hand, almost all information must be freshly obtained, i.e. the previous information is unlearned when adapting to a new status.

Due to economized computer power, the "process navigator" according to the present invention can be used preferably to calculate the status in advance and to execute only the appropriate setting actions for attaining the optimization target. In so doing, the process model is constantly fine-tuned in order to reach the optimization target more economically in the future. In a preferred treatment of the process model in a neural network, it is initially preferable to carry out an initialization with selected statuses and a smoothed and weighted time behavior of the system in order to avoid random setting actions in the future.

By including the activation of a boiler blower (soot blower) as a setting action and/or the particle size of the fuel as a setting variable, there will be more setting variables available for performing the control. At the same time, the new setting variables are no longer a source of interference that would cause a greater control effort during activation. Instead of a combination of both setting variables, it is also possible to include only one of these variables for controlling. To start with, the influence of the new setting variables is preferably measured in an initialization phase in order to train the controlling process; this is done, for example, by means of a neural network. The inclusion according to the invention can be applied in combustion processes and other thermodynamic processes.

In the case of a boiler blower, the decision on its activation is made preferably by weighing the effort and the success, for example by defining fictitious costs and integrating them during a given time interval, so that the decision can be fully automated. When factoring the particle size of the fuel, one can additionally take into consideration the wear and tear on the assigned mill in order to fine-tune the controlling process. The effect of different particle sizes is preferably measured through the fluctuations in the ray image of a flame. With the information gained on the effect of the activation of the boiler blower, the particle size of the fuel and the wear and tear on the mill, it is also possible to control either the boiler blower and/or the mill independently without having to control the combustion process for this.

If, in systems with sampling devices, the computer connected with the sensors determines the moment for activating the sampling device, this, on the one hand, economizes resources, since only the necessary number of sample analyses have to be carried out; on the other hand, there is more data available in critical situations for a decision process in the computer; this, for example, optimizes the controlling process. Sampling is thus completely integrated into the monitoring process and preferably into the controlling process. In addition to the sampling device, one could imagine other "off-line" sensors feeding data into the computer together with the "on-line" sensors. Activating the sampling device can be done manually or automatically.

BRIEF DESCRIPTION OF THE DRAWINGS

The following figures illustrate the invention in detail with reference to one exemplary embodiment, with examples of applications.

DETAILED DESCRIPTION OF THE INVENTION

Figure 1:
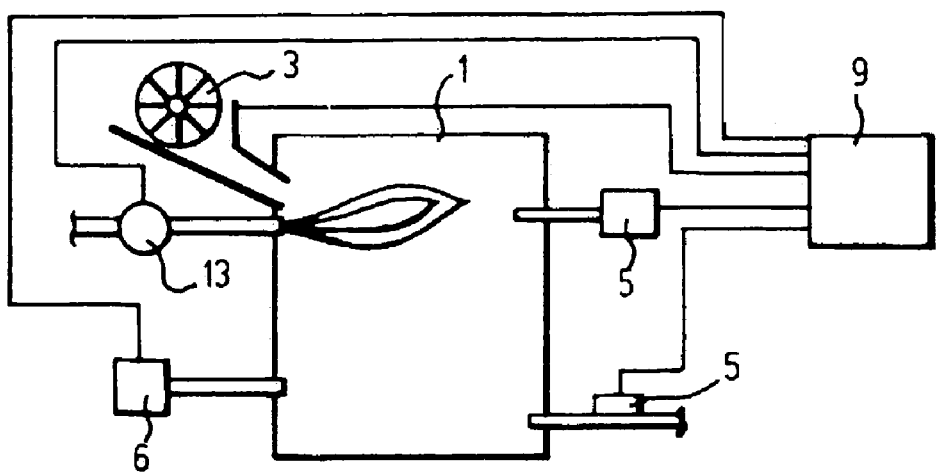
FIG. 1 schematically illustrates an exemplary application of the method according to the invention.
Figure 2:
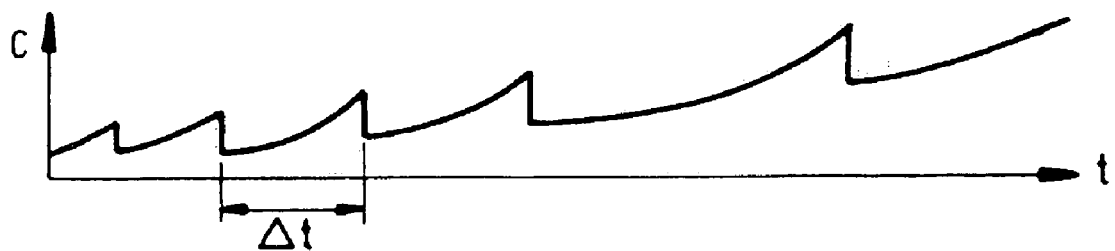
FIG. 2 is a time diagram of an exemplary process parameter over several cleaning intervals.

The exemplary process occurs as a combustion process in a fire boiler of a coal power plant and is to be controlled in such a way as to display, on the one hand, a certain stability and, on the other hand, a certain flexibility, i.e. it adapts to a given situation. The status in the boiler is described by (time-dependent) status variables $s_t$, for example the temperature in different locations inside the boiler, the flame textures and/or concentration of different pollutants in the exhaust air which are determined by suitable sensors. In the formal description of the combustion process, the parameters and variables, such as $s_t$, are to be considered as multi-dimensional vectors. The status $s_t$ of the combustion process can be changed by different actions $a_t$, in particular by changing the setting variables, for example the supply of coal, core air or expulsion air, but also the quality of the coal. There are optimization targets $r^j$ for the combustion process, for example to achieve a concentration of nitrogen oxide $NO_x$ and carbon monoxide CO which is below pre-determined limits or approaches a minimum.

For on-line monitoring and controlling and for predicting future boiler statuses by means of a neural network according to the invention, one defines, on the one hand, a process model PM reporting the change in the status $s_t$ of the combustion process as a reaction to actions $a_t$. The process model PM is independent of the optimization targets $r^j$ and operates on a time window of previous process statuses in order to integrate a time context. The concatenation of the variables contains information on specific properties of the boiler. On the other hand, one defines a quality $u_t$ for a situational evaluation SB, in which a specific current status $s_t$ is evaluated by taking into consideration the optimization targets $r^j$. This definition is done from the point of view of predetermined characteristic curves and a fuzzy logic concept, which means that in the simplest case, the quality at a certain pollutant concentration, for example, is $u_t=1$ for a minimum pollutant concentration and $u_t=0$ when the upper pollutant concentration threshold is reached, with a linear dependence between these two values. The situational evaluation SB is dependent on the actions $a_t$. For the evaluation at the time point t and the step towards the time point t+1, the following equation applies:

$$u_t = \Sigma u(r^j, s_t) \quad \text{(SB)}$$

$$s_{t+1} = f(s_t, a_t) \quad \text{(PM)}$$

In contrast to the known quality function which computationally folds the system status, the actions and the optimization targets so that the entire quality function must be redetermined in the event of changes in the status, the process model PM remains unaffected in the method according to the invention. In a numerical realization by means of a neural network, this means that it is not necessary to readapt the entire neural network for each action, losing the information from the past, which implies losing processing capacity and time, but that information on the process model is maintained. In an imagined representation of the status space in which any status $s_t$ is symbolized by a point on a map, the number of points on the map increases without loosing points.

The economized computer power can be used to calculate future system statuses and thus achieve an overall instead of a local optimization. To do so, a total quality Q is defined in which qualities $u_t$ for several pre-calculated situational evaluations are taken into consideration. For a number N of pre-calculated time steps, the following equation applies:

$$Q_N(s_t, a_t) = \sum_{n=1}^{N} u_{t+n}$$

By reason of the pre-calculations it is no longer necessary to make the boiler initiate different statuses by itself by means of a random walk model in order to find the conditions for the optimal combustion process.

In order to build the process model PM, one first determines the setting variables for the network architecture and the available status variables together with their technically possible and reasonably useable threshold values; preferable extension options are considered. A noise filter function to be applied prior to input into the neural network will be defined for the status variables that are to be measured. By using the method of optimal test planning, an exploration plan is designed which selects some statuses (approximately 500) being considered as reasonable from within the threshold values. By means of specific setting actions, these statuses are now successively produced in the boiler, at least approximately, and are then stored in the neural network. In this exploration it is useful, following a setting action with the help of stored past status variables which are smoothed and weighted (relation of the status variables before, during and after the setting action), to create a multi-channel time function which can be used to produce orderly changes in the status.

On the basis of this initialized process model PM, the boiler is optimally controlled during operation by first, in the neural network in dependence on the optimization targets $r^j$ on the basis of the present status, starting a numerical search for the overall system optimum and the optimal setting actions for reaching said target. The optimal setting actions can be achieved as follows: on the basis of the present status $s_t$, the effects of different actions $a^i$ are determined, in particular changes in the significant setting variables, i.e. the statuses $s^i_{t+1}$ are calculated through the process model PM and the quality $u^i_{t+1}$ is then calculated through the situational evaluation SM, if applicable several time steps in advance. The quality $u^i_{t+1}$ and/or the total quality $Q^i$ then automatically determines which setting variable is to be changed.

$$s_t \rightarrow a^1 \rightarrow s^1_{t+1} \rightarrow u^1_{t+1} \ldots \rightarrow Q^1$$
$$\ldots \quad \ldots \quad \ldots$$
$$a^i \rightarrow s^i_{t+1} \rightarrow u^i_{t+1} \ldots \rightarrow Q^i$$
$$\ldots \quad \ldots \quad \ldots$$

Once the optimal setting actions $a^i$ have been determined, the control electronics of the boiler carry out said setting actions $a^i$ automatically, for example by changing the supply of different fuels that is treated as a setting variable. In so doing, status variable data is continually collected and validated in the boiler in order to increase the density of known statuses $s_t$ on the map of the status space by training the neural network.

If, once the optimum has been reached, other actions $a_t$ occur, i.e. intended setting actions or unintended disturbances, renewed optimization using the described steps will be necessary. When training the process model PM, it may also be useful or necessary to extend the network architecture, for example beyond the threshold values considered as useful towards the technically possible threshold values if, while searching for the optimum, the neural network frequently reaches a threshold value that is considered as useful. Significance testing constantly monitors which setting variables have the greatest effects on the system status, so that their changes will be preferably taken into account when searching for the optimum, in particular if a major status change is necessary.

Generally speaking, it would be sufficient for controlling the boiler to take the (usual) setting variables from the actions and some characteristic process parameters from the status variables into account. However, if in this case, disturbance parameters, such as fluctuations in the quality of the coal or wear and tear in the boiler K, are also to be used as input into the process model, it will be necessary to monitor the inside of the boiler, for example by monitoring the flames. The following is a description of some application examples.

In a first application example, a combustion process to be controlled is occurring in a system in a fire boiler 1 of a coal power plant. Upstream from the boiler 1, there is a coal mill 3 grinding the coal to be burned which is then fed into the boiler 11. The boiler 1 also receives core air and expulsion air. The exhaust air produced is evacuated from the boiler. A number of sensors 5 in the feeder lines to the boiler 1, in the evacuation lines and on the inner walls of the boiler measure the relevant process parameters, for example the supplied air and coal, pollutant concentrations in the exhaust air, temperatures in the boiler 1, flame characteristics, etc. A so-called boiler blower 6 is provided for cleaning the inner boiler wall; when activated, it burns the residues on the inner boiler walls.

The sensors 5 are connected to a computer 9 to which different setting devices 13 are also connected, thereby creating a feedback loop or control loop. The combustion process is influenced by changing the setting variables, for example the coal stream and the air stream, i.e. the process parameters change. The activation of a setting device 13, such as a valve in an air feeder line, will be referred to as an action in the following text. A self-calibrating and self-learning, recurrent or time-delayed neural network of the type described above is implemented in the computer 9. The system configured this way is used for optimizing the combustion process, i.e. the computer 9 evaluates the input it receives and then polls the setting devices 13 accordingly.

The activation of the boiler blower 6 will be treated in an exemplary fashion as an action. For this purpose, it will be examined in an initialization phase how quickly the boiler 1 becomes soiled with different coal varieties and loads and how thorough the cleaning is after activating the boiler blower 6 in dependence on different time intervals Δt between two activations of the boiler blower 6. The cleaning result can be defined by different action results such as the change in pollutant concentration C in the exhaust air normed for the air flow or the change in efficiency.

The neural network learns this technical aspect of the soiling and cleaning model, i.e the kind of effects from two possible actions: activating the boiler blower 6 and not activating it. In addition, the neural network learns a cost aspect of the soiling and cleaning model, i.e. costs for using the boiler blower 6 are determined, for example by measuring energy loss or down-times, in the same way as they are determined for low efficiency or for exceeding the permissible pollutant thresholds in the exhaust air.

Figure 3:
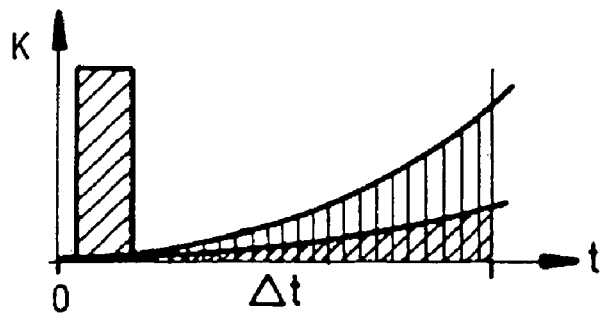
FIG. 3 is a time diagram of the costs in the soiling and cleaning model, and FIG. 4 schematically illustrates another example of application.

Once the neural network has learned the soiling and cleaning model, the boiler blower 6 can be used for controlling the combustion process. Using current process parameters, the neural network estimates the effect of activating or not activating the boiler blower 6 on the process parameters, and estimates the costs in these two cases. The costs K for both cases are integrated in dependence on a pre-determined planning interval Δt. In FIG. 3 the cost integral with activated boiler blower is obliquely hatched and the cost integral without activated boiler blower is vertically hatched. The computer 9 will then decide in dependence on this estimate whether the boiler blower 6 is to be activated or not.

The particle size of the ground coal is treated as another setting variable, i.e. actions to change said setting variable are different setting actions in the controllable coal mill 6, which have an effect on the fineness of the ground coal, e.g. the engine speed of the drums, the angle of the flaps, the down pressure of the drums or the temperature of the evacuation air. The corresponding setting devices are connected to the same computer 9 in which the neural network is implemented.

Accordingly, in the initialization phase one examines the change in the process parameters in dependence on the coal particle size. For example, one can perform a frequency analysis in the local time/space on a (spatially and) time-resolved radiation measurement of the flames in the boiler 1, for example by means of a time-delay neural network or so-called w-flat. The shape, height, breadth and, if applicable, a peak shift can provide information on fluctuations and thereby on the coal particle size which cause said fluctuations in the flame image.

The neural network learns this mill model obtained from the initialization phase and improves it during the operation of the boiler 1 by means of the data provided by the sensors 5. A measuring device is installed in the coal mill 3 as a further source of information, for example a (special) video camera, such as a CCD camera, a depth tactile measuring device or a structure sample measuring device for calibration which, at every stop of the coal mill 3, for example during maintenance, provides a status report which is then subjected to a characteristics analysis in the computer 9, in particular to determine wear and tear. The information obtained this way is correlated with the other information on the combustion process and is available for the learning process of the neural network. The mill model is therefore also used for controlling the combustion process.

In a modified form, controlling can include, in addition to the usual setting variables, the soiling and cleaning model with the boiler blower 6, but without considering the coal particle size, or the mill model without the boiler blower 6.

Figure 4:
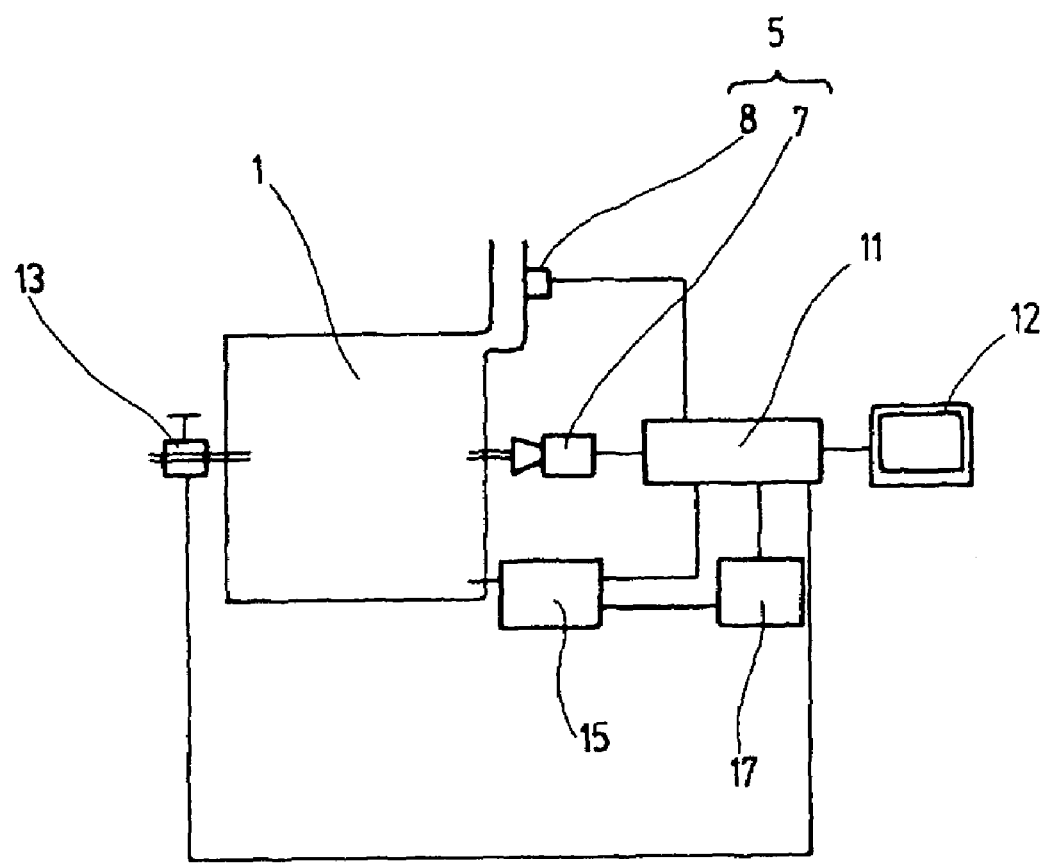

In another exemplary application, which is illustrated in FIG. 4, the combustion process in a boiler 1 of a garbage incinerator is constantly monitored with several sensors 5, for example with a camera 7 which captures the flame image, and with exhaust sensors 8 which monitor the gaseous combustion products. The different sensors 5 are connected to a computer 9 in which a neural network of the type described above is implemented determining the status in the garbage incinerator 1 by means of the signals coming from the sensors 5. Said status, for example, is displayed on a monitor 11, among other things, for example, as a live image.

To control the combustion process, for example with a view to obtaining the lowest possible pollutant concentration in the combustion products, the computer 9 can poll different setting devices 13 which define, for example, the air supply or the supply of additional fuel. The status in the boiler 1 then changes through a change in said setting variables which is calculated by the computer 9.

In addition to the aforementioned "on-line" sensors 5, there is a sampling device 15 with a sample evaluation device 17 connected to it, together working as an "off-line" sensor. Once the computer 9 detects that the status in the boiler 1 is approaching a critical level and additional data will be useful for the controlling strategy, the computer 9, at a time it itself determines, emits a signal for activating the sampling device 15.

In the simplest case, the sampling device 15 is manually activated once the sampling order has appeared on the monitor 11, and the sample taken is forwarded to the sample evaluation device 17. In an automated version, the sampling device 15 polled by the computer 9 is machine-activated and the sample taken automatically forwarded to the sample evaluation device 17. In all cases, the sample evaluation device 17 sends the result of the analysis, preferably a chemical analysis, to the computer 9 which includes the data in the controlling process.

That which is claimed:

1. A method for controlling a thermodynamic process of a system, the method comprising:
   providing optimization targets which relate to predetermined operation of the thermodynamic process of the system;
   determining a process model which is independent of the optimization targets and which describes effects of actions on status of the thermodynamic process of the system;
   measuring the status of the system;
   determining actions to take in an effort to cause the thermodynamic process of the system to perform closer to the optimization targets, wherein the determining the actions is carried out using at least the process model, the measured status, and a situational evaluation, and wherein the situational evaluation is independent of the process model and evaluates status of the thermodynamic process of the system with regard to the optimization targets by using quality functions; and
   then carrying out the determined actions in the system,
   wherein at least partially by virtue of the process model being independent of the optimization targets, and the situational evaluation being independent of the process model, the determining the process model includes retaining past information about the system's status so that the process model can continue to use the past information also after major changes in the system's status.

2. A method according to claim 1, wherein the determining the process model and the determining the actions to take are carried out by a computer.

3. A method according to claim 1:
   wherein the situational evaluation using the quality functions includes determining, at time t, a quality function $u_t$ as follows $u_t = \Sigma u(r^j, s_t);$ wherein $u(r^j, s_t)$ represents the quality functions, $s_t$ represents status variables, and $r^j$ represents the optimization targets;
   wherein the determining the actions to take using at least the process model includes determining, at time t+1, status variables $s_{t+1}$ as follows $s_{t+1} = f(s_t, a_t);$ and wherein $a_t$ represents different actions that can change the thermodynamic process of the system.

4. A method according to claim 3, wherein:
   the determining the actions includes:
      numerically calculating, using the process model, effects of a plurality of different actions on the status of the thermodynamic process of the system,
      individually evaluating the effects using the situational evaluation,
      selecting, based upon the evaluating, actions of the plurality of actions which will more optimally cause the thermodynamic process of the system to perform closer to the optimization targets; and
   carrying out the determined actions in the system includes carrying out the selected actions in the system.

5. A method according to claim 4, wherein the effects are calculated several time steps in advance and an overall quality is determined.

6. A method according to claim 5, wherein the overall quality Q, for a number N of pre-calculated time steps, is determined as follows:

$$Q_N(s_t, a_t) = \sum_{n=1}^{N} u_{t+n}.$$

7. A method according to claim 3, wherein the process model is stored in a neural network which is constantly trained.

8. A method according to claim 3, wherein the system includes a boiler, the thermodynamic process of the system includes a combustion process in the boiler which is fired with solid fuel, and the actions include one or more actions selected from the group consisting of activation of a blower of the boiler and adjustment of particle size of the fuel.

9. A method according to claim 3, wherein:
   the system includes a boiler and the thermodynamic process of the system includes a combustion process in the boiler,
   the measuring the status of the system includes:
      monitoring the combustion process with at least one sensor while the combustion process is taking place in the boiler,
      evaluating the combustion process with a computer that is connected to the sensor, with the evaluating the combustion process occurring while the combustion process is taking place in the boiler, and
      taking a sample from the boiler using a sampling device, wherein the computer determines when the sample should be taken and the taking the sample is responsive to the computer determining that the sample should be taken.

10. A method according to claim 3, wherein the determining the process model and the determining the actions to take are carried out by a computer.

11. A method according to claim 10, wherein the process model is continually fine-tuned with information from ongoing measurements of the status of the thermodynamic process of the system.

12. A method according to claim 11, wherein the results of the ongoing measurements, prior to feeding them into the process model, are subjected to a noise filter.

13. A method according to claim 10, wherein prior to continuous use of the system, an exploration of a number of selected statuses of the system is performed to initialize the process model.

14. A method according to claim 13, wherein the exploration takes into account smoothed and weighted time behavior of the system in response to action upon the system.

15. A method according to claim 10, wherein the quality functions are set up according to fuzzy logic rules.

16. A method according to claim 4, wherein the thermodynamic process of the system is a combustion process.

17. A method according to claim 4, wherein the process model is continually fine-tuned with information from ongoing measurements of the status of the system.

18. A method according to claim 4, wherein the system includes a boiler, the thermodynamic process of the system includes a combustion process in the boiler which is fired with solid fuel, and the actions include one or more actions selected from the group consisting of activation of a blower of the boiler and adjustment of particle size of the fuel.

19. A method according to claim 4, wherein:
the system includes a boiler and the thermodynamic process of the system includes a combustion process in the boiler,
the measuring the status of the system includes:
monitoring the combustion process with at least one sensor while the combustion process is taking place in the boiler,
evaluating the combustion process with a computer that is connected to the sensor, with the evaluating the combustion process occurring while the combustion process is taking place in the boiler, and
taking a sample from the boiler using a sampling device, wherein the computer determines when the sample should be taken and the taking the sample is responsive to the computer determining that the sample should be taken.

20. A method according to claim 1, wherein the measuring the status of the system comprises measuring the status of the thermodynamic process of the system.

21. An apparatus for controlling a thermodynamic process of a system, the apparatus comprising:
sensors for measuring status of the system;
a computer programmed for:
determining a process model which is independent of optimization targets and which describes effects of actions on status of the system, wherein the optimization targets relate to operation of the system,
determining actions to take in an effort to cause the system to perform closer to the optimization targets, wherein the determining the actions is carried out using at least the process model, the measured status, and a situational evaluation, wherein the situational evaluation is independent of the process model and evaluates status of the system with regard to the optimization targets by using quality functions, and
providing feedback to the system for initiating a carrying out the determined actions in the system,
wherein at least partially by virtue of the process model being independent of the optimization targets, and the situational evaluation being independent of the process model, the determining the process model includes retaining past information about the system's status so that the process model can continue to use the past information also after major changes in the system's status.

22. An apparatus according to claim 21, wherein:
the determining the actions includes:
numerically calculating, using the process model, effects of a plurality of different actions on the status of the system,
individually evaluating the effects using the situational evaluation,
selecting, based upon the evaluating, actions of the plurality of actions which will more optimally cause the system to perform closer to the optimization targets; and
the providing feedback to the system includes providing feedback to the system for initiating a carrying out the selected actions in the system.

23. An apparatus according to claim 21:
wherein the situational evaluation using the quality functions includes determining, at time t, a quality function $u_t$ as follows $$u_t = \Sigma u(r^j, s_t);$$

wherein $u(r^j, s_t)$ represents the quality functions, $s_t$ represents status variables, and $r^j$ represents the optimization targets;
wherein the determining the actions to take using at least the process model includes determining, at time t+1, status variables $s_{t+1}$ as follows $$s_{t+1} = f(s_t, a_t); \text{ and}$$

wherein $a_t$ represents different actions that can change the thermodynamic process of the system.

24. A method for controlling a thermodynamic process of a system, the method comprising:
determining a process model which is independent of an optimization target and which describes effects of actions on status of the thermodynamic process of the system, wherein the optimization target relates to predetermined operation of the system,
determining action to take in an effort to cause the system to perform closer to the optimization target, wherein the determining the action includes:
using the process model to determine at least:
a calculated first status of the system which should result from first action upon the system, and
a calculated second status of the system which should result from second action upon the system, and
using a situational evaluation to determine which one of the first status and the second status is more optimal with respect to causing the thermodynamic process of the system to perform closer to the optimization target, wherein the situational evaluation is independent of the process model and evaluates status of the system with regard to the optimization target by using at least one quality function; and
then indicating either:
that the first action should be taken if it was determined using the situational evaluation that the first status is more optimal than the second status with respect to causing the thermodynamic process of the system to perform closer to the optimization target, or
that the second action should be taken if it was determined using the situational evaluation that the second status is more optimal than the first status with respect to causing the thermodynamic process of the system to perform closer to the optimization target,
wherein at least partially by virtue of the process model being independent of the optimization targets, and the situational evaluation being independent of the process model, the determining the process model includes retaining Past information about the system's status so that the process model can continue to use the past information also after major changes in the system's status.

25. A method according to claim 24, wherein the thermodynamic process of the system is a combustion process.

26. A computer-readable medium comprising computer-executable instructions for performing the method of claim 24.

27. A method according to claim 24, wherein the determining the process model and the determining the actions to take are carried out by a computer.

28. A method according to claim 27:
wherein the situational evaluation using the quality functions includes determining, at time t, a quality function $u_t$ as follows $$u_t = \Sigma u(r^j, s_t);$$

wherein $u(r^j, s_t)$ represents the quality functions, $s_t$ represents status variables, and $r^j$ represents the optimization targets;

wherein the determining the actions to take using at least the process model includes determining, at time t+1, status variables $s_{t+1}$ as follows $$s_{t+1} = f(s_t, a_t); \text{ and}$$

wherein $a_t$ represents different actions that can change the thermodynamic process of the system.

* * * * *